US012618455B2

(12) United States Patent
Chen et al.

(10) Patent No.: US 12,618,455 B2
(45) Date of Patent: May 5, 2026

(54) BEVEL GEAR PAIR WITH CONSTANT MESHING CHARACTERISTICS CONSTRUCTED TOOTH PAIR

(71) Applicants:Chongqing University, Chongqing (CN); Chongqing Yisilun Technology Co., Ltd., Chongqing (CN)

(72) Inventors: Bingkui Chen, Chongqing (CN); Dongyu Wang, Chongqing (CN); Luhe Zhang, Chongqing (CN); Xinxin Ye, Chongqing (CN); Wenjun Luo, Chongqing (CN); Yonghong Chen, Chongqing (CN); Chaoyang Li, Chongqing (CN); Changyan Peng, Chongqing (CN); Hehe Lu, Chongqing (CN)

(73) Assignees: Chongqing University, Chongqing (CN); Chongqing Yisilun Technology Co., Ltd., Chongqing (CN)

( * ) Notice: Subject to any disclaimer, the term of this patent is extended or adjusted under 35 U.S.C. 154(b) by 29 days.

(21) Appl. No.: 18/653,633

(22) Filed: May 2, 2024

(65) Prior Publication Data

US 2024/0401670 A1 Dec. 5, 2024

(30) Foreign Application Priority Data

May 31, 2023 (CN) .......................... 202310633244.2

(51) Int. Cl.
*F16H 1/14* (2006.01)
*F16H 55/08* (2006.01)

(52) U.S. Cl.
CPC ........... *F16H 1/14* (2013.01); *F16H 55/0813* (2013.01); *F16H 2055/0866* (2013.01)

(58) Field of Classification Search
CPC ........ F16H 1/14; F16H 55/08; F16H 55/0813; F16H 2055/173
See application file for complete search history.

(56) References Cited

U.S. PATENT DOCUMENTS

| | | | | |
|---|---|---|---|---|
| 12,313,147 B2 * | 5/2025 | Chen | ....................... | F16H 55/08 |
| 12,352,347 B2 * | 7/2025 | Chen | ....................... | F16H 55/17 |

(Continued)

FOREIGN PATENT DOCUMENTS

| | | | |
|---|---|---|---|
| CN | 103075493 A | 5/2013 |
| CN | 105202152 A | 12/2015 |

(Continued)

*Primary Examiner* — Bobby Rushing, Jr.
(74) *Attorney, Agent, or Firm* — CM Law LLP; Robert C. Klinger

(57) ABSTRACT

A bevel gear pair with constant meshing characteristics with a constructed tooth pair is provided. The bevel gear pair with a constructed tooth pair includes a bevel gear I with a constructed tooth pair and a bevel gear II with a constructed tooth pair based on conjugate curves. In the present disclosure, a normal tooth profile curve of the bevel gear I with a constructed tooth pair and a normal tooth profile curve of the bevel gear II with a constructed tooth pair are continuous combined curves with the same curve shape, which facilitates machining by the same cutter. A common normal at an inflection point or a tangent point of the continuous combined curve passes through a pitch point of the bevel gear pair with a constructed tooth pair, and a position of the inflection point or the tangent point can be adjusted according to an actual demand.

5 Claims, 5 Drawing Sheets

(56)          References Cited

U.S. PATENT DOCUMENTS

2024/0401684 A1 * 12/2024 Chen ......................... F16H 1/08
2024/0401685 A1 * 12/2024 Zhang .................... F16H 55/08

FOREIGN PATENT DOCUMENTS

| CN | 105485254 | B | * | 7/2018 | ............. | F16H 55/08 |
| CN | 111322373 | B | * | 5/2021 | ............. | F16H 55/08 |
| CN | 108716532 | B | * | 10/2021 | ......... | F16H 55/0806 |
| CN | 115574052 | A | * | 1/2023 | ............... | F16H 1/14 |
| EP | 3348868 | B1 | * | 3/2021 | ......... | F16H 55/0826 |
| EP | 3348869 | B1 | * | 3/2021 | ......... | F16H 55/0826 |
| WO | WO-2006038901 | A1 | * | 4/2006 | ............. | F16H 55/08 |
| WO | WO-2012048599 | A1 | * | 4/2012 | ......... | F16H 55/0813 |

* cited by examiner

BEVEL GEAR PAIR WITH CONSTANT MESHING CHARACTERISTICS CONSTRUCTED TOOTH PAIR

CROSS REFERENCE TO RELATED APPLICATION

This patent application claims the benefit and priority of Chinese Patent Application No. 202310633244.2, filed with the China National Intellectual Property Administration on May 31, 2023, the disclosure of which is incorporated by reference herein in its entirety as part of the present application.

TECHNICAL FIELD

The present disclosure relates to the technical field of gear transmission, in particular, to a bevel gear pair with constant meshing characteristics with a constructed tooth pair, and especially to a bevel gear pair with a constructed tooth pair that is formed by a bevel gear I with a constructed tooth pair and a bevel gear II with a constructed tooth pair as a pair, and has the same normal tooth profile, a constant curvature radius at a meshing point that tends to infinity, and a constant sliding ratio.

BACKGROUND

Bevel gears are key basic components for motion transmission and power transformation between intersecting shafts or staggered shafts, and are widely used in the fields of aerospace, vehicles and vessels, industrial automation equipment, and the like. Patents No. 103075493 A and No. 105202152 A each disclose a bevel gear pair based on conjugate curves. Each bevel gear pair constructed in the above two patents includes a convex-tooth bevel gear and a concave-tooth bevel gear, and a pair of bevel gears with concave and convex tooth profiles in the bevel gear pair needs machining by means of different cutters, which increases a manufacturing cost of the bevel gear pair. The concave and convex tooth profiles lead to a limited curvature radius at a meshing point of the gear pair, thereby limiting further improvement of the bearing capacity of the bevel gear pair. Therefore, there is an urgent need to innovate a tooth profile design based on an existing gear design theory with spatial conjugate curves, improve meshing performance of the bevel gear pair with a constructed tooth pair, and reduce a production and manufacturing cost of the bevel gear pair with a constructed tooth pair.

SUMMARY

In view of this, the present disclosure provides a bevel gear pair with constant meshing characteristics with a constructed tooth pair. The gear pair is formed by a bevel gear I with a constructed tooth pair and a bevel gear II with a constructed tooth pair that have the same normal tooth profile, with a constant curvature radius at a meshing point that tends to infinity and a constant sliding ratio, and technically features low manufacturing cost, high bearing capacity, high transmission efficiency, and the like.

To achieve the above objective, the present disclosure provides the following solution. The present disclosure provides a bevel gear pair with constant meshing characteristics with a constructed tooth pair, including a bevel gear I with a constructed tooth pair and a bevel gear II with a constructed tooth pair as a pair based on conjugate curves, where a normal tooth profile curve $\Gamma_{s1}$ of the bevel gear I with a constructed tooth pair and a normal tooth profile curve $\Gamma_{s2}$ of the bevel gear II with a constructed tooth pair are continuous combined curves $\Gamma_L$ with the same curve shape, and the continuous combined curves $\Gamma_L$ include a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function; the continuous combined curve is formed by two continuous curves, a connection point of the two continuous curves is an inflection point or a tangent point of the continuous combined curve, and the inflection point or the tangent point of the continuous combined curve is a designated point located on a meshing force action line of the bevel gear pair with a constructed tooth pair; and the normal tooth profile curve $\Gamma_{s1}$ and the normal tooth profile curve $\Gamma_{s2}$ are swept along given conjugate curves to obtain tooth surfaces of the bevel gear I with a constructed tooth pair and the bevel gear II with a constructed tooth pair.

Further, in the bevel gear pair with constant meshing characteristics with a constructed tooth pair, when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}{:}x_{10} = t, \ y_{10} = 0 \ (t_1 \le t < 0) \\ \Gamma_{L12}{:}x_{10} = t, \ y_{10} = At^{2n-1} \ (0 \le t \le t_2) \end{cases},$$

where $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

Further, in the bevel gear pair with constant meshing characteristics with a constructed tooth pair, when the continuous combined curve $\Gamma_L$ is the combined curve $\Gamma_{L2}$ of the sine function curve and the tangent at the inflection point thereof, the continuous combined curve $\Gamma_L$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}{:}x_{20} = t, \ y_{20} = kt \ (t_1 \le t < 0) \\ \Gamma_{L22}{:}x_{20} = t, \ y_{20} = A\sin(Bt) \ (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

Further, in the bevel gear pair with constant meshing characteristics with a constructed tooth pair, when the continuous combined curve $\Gamma_L$ is the combined curve $\Gamma_{L3}$ of the epicycloid function curve and the tangent at the inflection point thereof, the continuous combined curve $\Gamma_L$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}{:}x_{30} = t, \; y_{30} = kt \quad (t_1 \le t < 0) \\ \Gamma_{L32}{:} \\ \quad x_{30} = (R+r)\sin t - e\sin\big((R+r)t/r\big) \qquad\qquad (0 \le t < t_2) \\ \quad y_{30} = (R+r)\cos t - e\cos\big((R+r)t/r\big) - (R+r-e) \end{cases},$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; R and r are radii of a cycloidal moving circle and fixed circle, respectively; and e is an eccentric distance.

Further, in the bevel gear pair with constant meshing characteristics with a constructed tooth pair, when the continuous combined curve $\Gamma_L$ is the combined curve $\Gamma_{L4}$ of the odd power function, the continuous combined curve $\Gamma_L$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}{:}x_{40} = t, \; y_{40} = At^{2n1-1} \quad (t_1 \le t < 0) \\ \Gamma_{L42}{:}x_{40} = t, \; y_{40} = Bt^{2n2-1} \quad (0 \le t \le t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

Further, in the bevel gear pair with constant meshing characteristics with a constructed tooth pair, when the continuous combined curve $\Gamma_L$ is the combined curve $\Gamma_{L5}$ of the sine function, the continuous combined curve $\Gamma_L$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}{:}x_{50} = t, \; y_{50} = A_1\sin(B_1 t) \quad (t_1 \le t < 0) \\ \Gamma_{L52}{:}x_{50} = t, \; y_{50} = A_2\sin(B_2 t) \quad (0 \le t \le t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $t_2$ are value ranges of the continuous curve; and $A_1$, $B_1$, $A_2$ and $B_2$ are coefficients of the equation.

Further, in the bevel gear pair with constant meshing characteristics with a constructed tooth pair, when the continuous combined curve $\Gamma_L$ is the combined curve $\Gamma_{L6}$ of the epicycloid function, the continuous combined curve $\Gamma_L$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}{:} \\ \quad x_{60} = -(R_1+r_1)\sin t + e\sin\big((R_1+r_1)t/r_1\big) \qquad (t_1 \le t < 0) \\ \quad y_{60} = -(R_1+r_1)\cos t + e\cos\big((R_1+r_1)t/r_1\big) - (R_1+r_1-e) \\ \Gamma_{L62}{:} \\ \quad x_{60} = (R_2+r_2)\sin t - e\sin\big((R_2+r_2)t/r_2\big) \qquad (0 \le t < t_2) \\ \quad y_{60} = (R_2+r_2)\cos t - e\cos\big((R_2+r_2)t/r_2\big) - (R_2+r_2-e) \end{cases},$$

where $x_{60}$ and $y_{60}$ are x-axis and y-axis coordinate values of the combined curve in the rectangular coordinate system, respectively; a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; and e is an eccentric distance.

Further, in the bevel gear pair with constant meshing characteristics with a constructed tooth pair, a curve equation of the normal tooth profile curve $\Gamma_{s1}$ of the bevel gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4),$$

where $x_{01}$ and $y_{01}$ are x-axis and y-axis coordinate values of the normal tooth profile curve of the bevel gear I with a constructed tooth pair in the rectangular coordinate system, respectively.

Further, in the bevel gear pair with constant meshing characteristics with a constructed tooth pair, a curve equation of the normal tooth profile curve $\Gamma_{s2}$ of the bevel gear II with a constructed tooth pair obtained by rotating the normal tooth profile curve $\Gamma_{s1}$ of the bevel gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

where $x_{02}$ and $y_{02}$ are x-axis and y-axis coordinate values of the normal tooth profile curve of the bevel gear II with a constructed tooth pair in the rectangular coordinate system, respectively.

Further, in the bevel gear pair with constant meshing characteristics with a constructed tooth pair, a tooth surface $\Sigma_1$ of the bevel gear I with a constructed tooth pair is obtained by sweeping the normal tooth profile curve $\Gamma_{s1}$ of the bevel gear I with a constructed tooth pair along a given helix, with a tooth surface equation as follows:

$$\begin{pmatrix} x_{\Sigma 1} \\ y_{\Sigma 1} \\ z_{\Sigma 1} \\ 1 \end{pmatrix} = M_{1\sigma_1} \cdot \begin{pmatrix} x_{01} \\ y_{01} \\ 0 \\ 1 \end{pmatrix},$$

where $x_{\Sigma 1}$, $y_{\Sigma 1}$ and $z_{\Sigma 1}$ are coordinate values of the tooth surface of the bevel gear I with a constructed tooth pair; and $M_{1\sigma_1}$ is a sweep transformation matrix.

Further, in the bevel gear pair with constant meshing characteristics with a constructed tooth pair, a tooth surface $\Sigma_2$ of the bevel gear II with a constructed tooth pair is obtained by sweeping the normal tooth profile curve $\Gamma_{s2}$ of the bevel gear II with a constructed tooth pair along a given helix, with a tooth surface equation as follows:

$$\begin{pmatrix} x_{\Sigma 2} \\ y_{\Sigma 2} \\ z_{\Sigma 2} \\ 1 \end{pmatrix} = M_{2\sigma_1} \cdot \begin{pmatrix} x_{02} \\ y_{02} \\ 0 \\ 1 \end{pmatrix},$$

where $x_{\Sigma 2}$, $y_{\Sigma 2}$ and $z_{\Sigma 2}$ are coordinate values of the tooth surface of the bevel gear II with a constructed tooth pair, respectively; and $M_{2\sigma_2}$ is a sweep transformation matrix.

Compared with the prior art, the present disclosure has the following beneficial technical effects:

In the present disclosure, a bevel gear I with a constructed tooth pair and a bevel gear II with a constructed tooth pair have the same normal tooth profile, and can be machined by using the same cutter, thus reducing a manufacturing cost. A curvature radius at a meshing point is constant and tends to infinity, which improves the bearing capacity of the bevel gear pair. A sliding ratio during meshing is constant and may be designed as a zero sliding ratio, which improves transmission efficiency of the bevel gear pair and reduces wear during transmission.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1. Bevel gear I with a constructed tooth pair; 2. Bevel gear II with a constructed tooth pair; 3. Pitch cone of the bevel gear II with a constructed tooth pair; 4. Pitch cone of the bevel gear I with a constructed tooth pair; 5. Tooth profile sweeping direction; 6. Tooth surface obtained by sweeping of a normal tooth profile curve family; 7. Base cone of the bevel gear II with a constructed tooth pair; 8. Base cone of the bevel gear I with a constructed tooth pair; 9. Given helix.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

In view of this, the present disclosure provides a bevel gear pair with constant meshing characteristics with a constructed tooth pair. The gear pair is formed by a bevel gear I with a constructed tooth pair and a bevel gear II with a constructed tooth pair that have the same normal tooth profile, with a constant curvature radius at a meshing point that tends to infinity and a constant sliding ratio, and technically features low manufacturing cost, high bearing capacity, high transmission efficiency, and the like.

In order to make the above objective, features and advantages of the present disclosure clearer and more comprehensible, the present disclosure will be further described in detail below in combination with accompanying drawings and specific implementations.

As shown in FIGS. 1 to 7, in a bevel gear pair with constant meshing characteristics with a constructed tooth pair according to the present disclosure, a normal tooth profile curve of a bevel gear I 1 with a constructed tooth pair and a normal tooth profile curve of a bevel gear II 2 with a constructed tooth pair are continuous combined curves with the same curve shape, and a meshing point of the bevel gear I 1 with a constructed tooth pair and the bevel gear II 2 with a constructed tooth pair is at an inflection point or a tangent point of the continuous combined curve.

In the embodiment of the present disclosure, basic parameters of the bevel gear pair with constant meshing characteristics with a constructed tooth pair are as follows: Large-end surface module m=8, number of teeth of the bevel gear I 1 with a constructed tooth pair: $z_1$=8, number of teeth of the bevel gear II 2 with a constructed tooth pair: $z_2$=24, addendum coefficient $h_a{}^*$=0.5, tip clearance coefficient c*=0.2, addendum $h_a$=4 mm, dedendum $h_f$=5.6 mm, helix angle β=35°, and tooth width w=30 mm.

Figure 1:
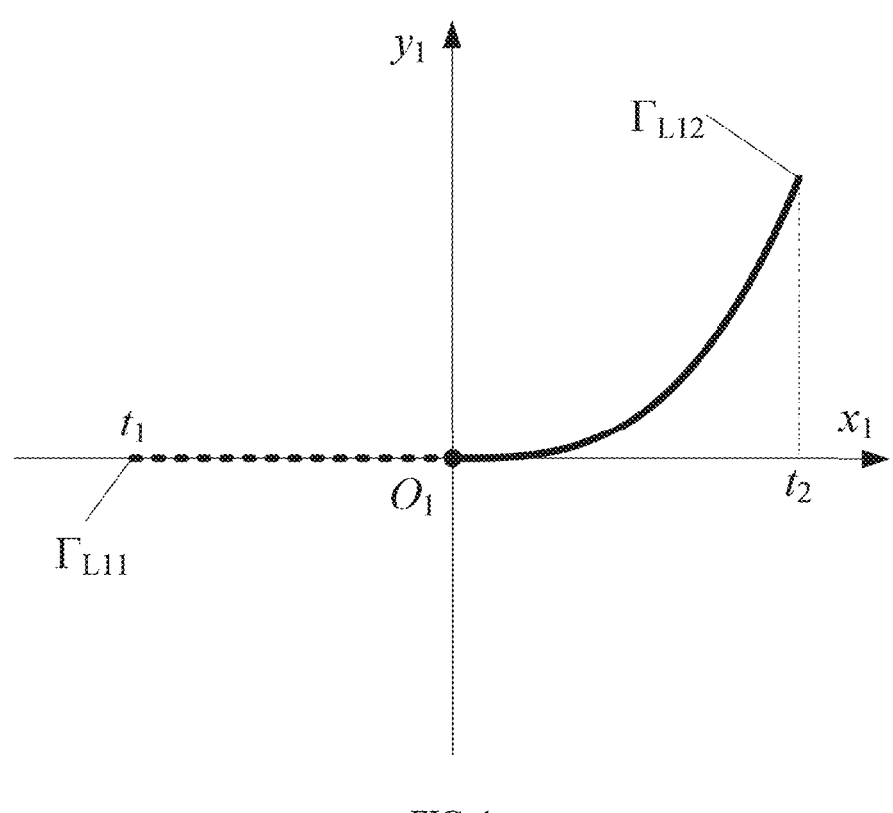
FIG. 1 is a schematic diagram of a combined curve of an odd power function curve and a tangent at an inflection point thereof according to an embodiment of the present disclosure.

With a combined curve of an odd power function curve and a tangent at an inflection point thereof as an example, the combined curve of the odd power function curve and the tangent at the inflection point thereof was drawn in a rectangular coordinate system $\sigma_1$ (O–x,y), as shown in FIG. 1. With a coefficient A=1.5 and n=2, an equation of a combined curve $\Gamma_{L1}$ (formed by an odd power function curve $\Gamma_{L12}$ and a tangent $\Gamma_{L11}$ at an inflection point of the odd power function curve) of an odd power function curve and a tangent at an inflection point thereof is as follows:

$$\begin{cases} \Gamma_{L11}: x_{10} = t,\ y_{10} = 0\ (t_1 \le t < 0) \\ \Gamma_{L21}: x_{10} = t,\ y_{10} = 1.5t^3\ (0 \le t \le t_2) \end{cases},$$

where $x_{10}$ and $y_{10}$ are x-axis and y-axis coordinate values of the combined curve in the rectangular coordinate system $\sigma_1$, respectively; a parameter t is an independent variable of the equation; and $t_1$ and $t_2$ are value ranges of the continuous curves.

Figure 2:
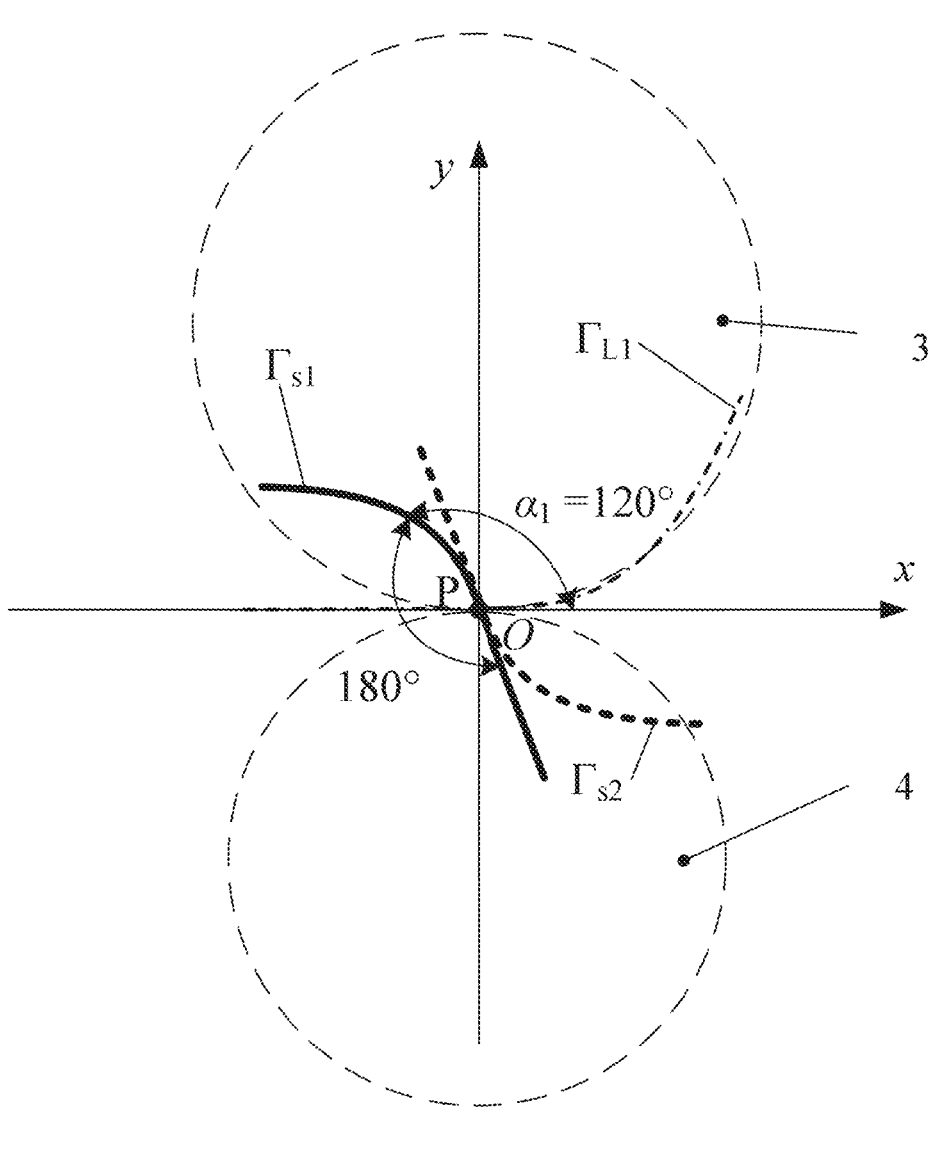
FIG. 2 is a schematic diagram illustrating formation of a normal tooth profile of a bevel gear pair with a constructed tooth pair having a combined curve of an odd power function curve and a tangent at an inflection point thereof as a tooth profile curve according to an embodiment of the present disclosure.

Provided is a schematic diagram illustrating formation of a normal tooth profile of a gear pair with a constructed tooth pair having a combined curve of an odd power function curve and a tangent at an inflection point thereof as a tooth profile curve according to an embodiment of the present disclosure, with an inflection point P being a meshing point, as shown in FIG. 2. In the figure, a tooth root of the bevel gear I 1 with a constructed tooth pair and a tooth root of the bevel gear II 2 with a constructed tooth pair are tangent segments, and a tooth tip of the bevel gear I 1 with a constructed tooth pair and a tooth tip of the bevel gear II 2 with a constructed tooth pair are cubic power function curve segments. When the continuous combined curve $\Gamma_L$ rotates around an origin of the rectangular coordinate system by an angle $\alpha_1$ to obtain a normal tooth profile curve $\Gamma_{s1}$ of the bevel gear I 1 with a constructed tooth pair, the value of the rotation angle $\alpha_1$ needs to be determined according to specific parameters of the bevel gear pair, with a general value range as follows: $0° < \alpha_1 < 180°$. A specific formation process and a tooth profile curve equation of the normal tooth profile of the bevel gear pair with a constructed tooth pair are as follows:

The combined curve $\Gamma_{L1}$ of the odd power function curve and the tangent at the inflection point thereof rotates around the rectangular coordinate system $\sigma_1$ by an angle of $\alpha_1$=120° to obtain the normal tooth profile curve $\Gamma_{s1}$ of the bevel gear I 1 with a constructed tooth pair, with a curve equation as follows:

$$\begin{cases} x_{01} = x_{10}\cos(120°) - y_{10}\sin(120°) \\ y_{01} = x_{10}\sin(120°) + y_{10}\cos(120°) \end{cases},$$

where $x_{01}$ and $y_{01}$ are x-axis and y-axis coordinate values of the normal tooth profile curve of the bevel gear I 1 with a constructed tooth pair in the rectangular coordinate system σ1, respectively.

A normal tooth profile curve $\Gamma_{s2}$ of the bevel gear II 2 with a constructed tooth pair is obtained by rotating the normal tooth profile curve $\Gamma_{s1}$ of the bevel gear I 1 with a constructed tooth pair around the origin of the rectangular coordinate system $\sigma_1$ by an angle of 180°, with a curve equation as follows:

$$\begin{cases} x_{02} = x_{01}\cos(180°) - y_{01}\sin(180°) \\ y_{02} = x_{01}\sin(180°) + y_{01}\cos(180°) \end{cases},$$

where $x_{02}$ and $y_{02}$ are x-axis and y-axis coordinate values of the normal tooth profile curve of the bevel gear II 2 with a constructed tooth pair in the rectangular coordinate system $\sigma_1$, respectively.

Figure 3:
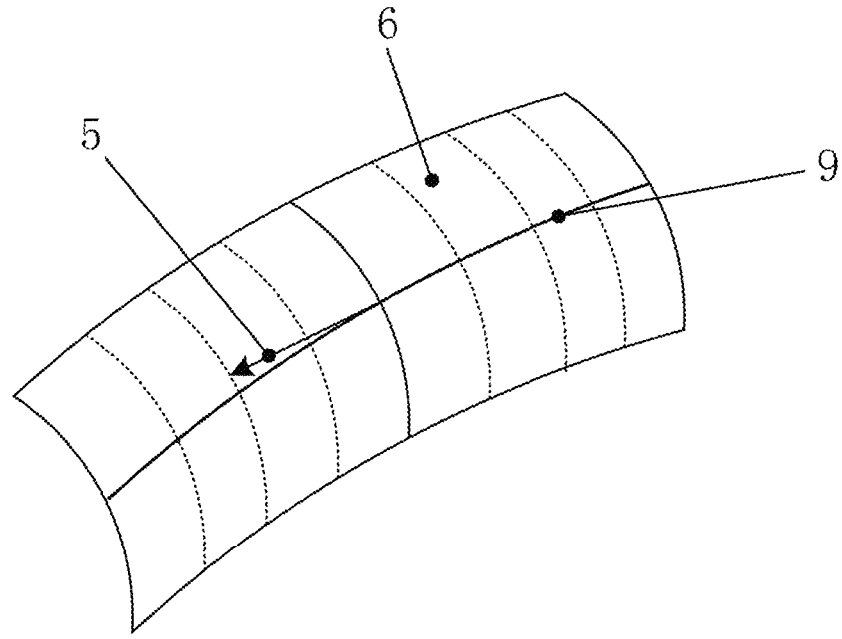
FIG. 3 is a schematic diagram illustrating construction of a tooth surface of a bevel gear pair with a constructed tooth pair having a combined curve of an odd power function curve and a tangent at an inflection point thereof as a tooth profile curve according to an embodiment of the present disclosure.

FIG. 3 is a schematic diagram illustrating construction of a tooth surface of a bevel gear pair with a constructed tooth pair having a combined curve of an odd power function curve and a tangent at an inflection point thereof as a tooth profile curve according to an embodiment of the present disclosure. A specific construction process and a tooth surface equation of the tooth surface of the bevel gear pair with a constructed tooth pair are as follows:

A tooth surface 21 of the bevel gear I 1 with a constructed tooth pair is obtained by sweeping the normal tooth profile curve $\Gamma_{s1}$ of the bevel gear I 1 with a constructed tooth pair along a given helix, with a tooth surface equation as follows:

$$\begin{pmatrix} x_{\Sigma1} \\ y_{\Sigma1} \\ z_{\Sigma1} \\ 1 \end{pmatrix} = M_{1\sigma_1} \cdot \begin{pmatrix} x_{01} \\ y_{01} \\ 0 \\ 1 \end{pmatrix},$$

where $x_{\Sigma1}$, $y_{\Sigma1}$ and $z_{\Sigma1}$ are coordinate values of the tooth surface of the bevel gear I 1 with a constructed tooth pair; and $M_{1\sigma_1}$ is a sweep transformation matrix.

Similarly, a tooth surface 22 of the bevel gear II 2 with a constructed tooth pair is obtained by sweeping the normal tooth profile curve $\Gamma_{s2}$ of the bevel gear II 2 with a constructed tooth pair along a given helix, with a tooth surface equation as follows:

$$\begin{pmatrix} x_{\Sigma2} \\ y_{\Sigma2} \\ z_{\Sigma2} \\ 1 \end{pmatrix} = M_{2\sigma_1} \cdot \begin{pmatrix} x_{02} \\ y_{02} \\ 0 \\ 1 \end{pmatrix},$$

where $x_{\Sigma2}$, $y_{\Sigma2}$ and $z_{\Sigma2}$ are coordinate values of the tooth surface of the bevel gear II 2 with a constructed tooth pair; and $M_{2\sigma_2}$ is a sweep transformation matrix.

Figure 4:
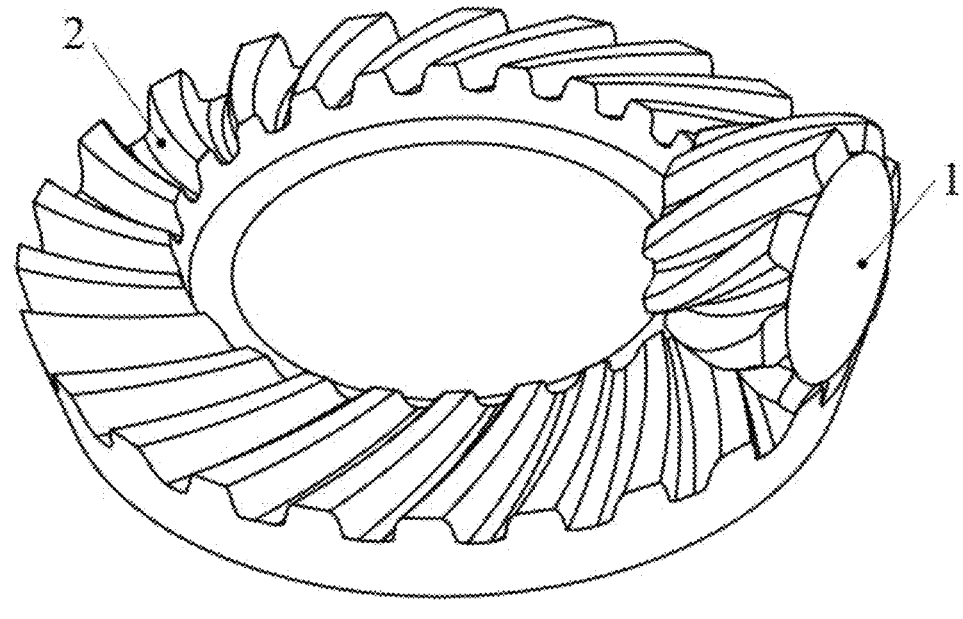
FIG. 4 is a schematic entity diagram of a bevel gear pair with a constructed tooth pair having a combined curve of an odd power function curve and a tangent at an inflection point thereof as a tooth profile curve according to an embodiment of the present disclosure.

FIG. 4 is a schematic entity diagram of a bevel gear pair with a constructed tooth pair having a combined curve of an odd power function curve and a tangent at an inflection point thereof as a tooth profile curve according to an embodiment of the present disclosure. A tip cone and a root cone are generated by rotation, and trimming, stitching, rounding, and other operations are performed on the tooth surfaces of the bevel gear I 1 with a constructed tooth pair and the bevel gear II 2 with a constructed tooth pair to obtain an entity model of the bevel gear pair with constant meshing characteristics with a constructed tooth pair.

In the embodiment of the present disclosure, the normal tooth profile curves of the bevel gear I 1 with a constructed tooth pair and the bevel gear II 2 with a constructed tooth pair each may alternatively be a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function, with a curve equation as follows:

When the continuous combined curve $\Gamma_L$ is the combined curve $\Gamma_{L2}$ of the sine function curve and the tangent at the inflection point thereof, the continuous combined curve $\Gamma_{L2}$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}: x_{20} = t, y_{20} = kt \ (t_1 \le t < 0) \\ \Gamma_{L22}: x_{20} = t, y_{20} = A\sin(Bt) \ (0 \le t \le t_2) \end{cases},$$

where $x_{20}$ and $y_{20}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the sine function curve; and A and B are coefficients of the equation.

When the continuous combined curve $\Gamma_L$ is the combined curve $\Gamma_{L3}$ of the epicycloid function curve and the tangent at the inflection point thereof, the continuous combined curve $\Gamma_{L3}$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}: x_{30} = t, y_{30} = kt \ (t_1 \le t < 0) \\ \Gamma_{L32}: \\ \quad x_{30} = (R+r)\sin t - e\sin((R+r)t/r) \\ \quad y_{30} = (R+r)\cos t - e\cos((R+r)t/r) - (R+r-e) \end{cases} (0 \le t < t_2),$$

where $x_{30}$ and $y_{30}$ are x-axis and y-axis coordinate values of the combined curve in the rectangular coordinate system, respectively; a parameter t is an independent variable of the equation; $t_1$ and $t_2$ are value ranges of the continuous curve; k is a slope of the tangent at the inflection point of the epicycloid function curve; R and r are radii of a cycloidal moving circle and fixed circle, respectively; and e is an eccentric distance.

When the continuous combined curve $\Gamma_L$ is the combined curve $\Gamma_{L4}$ of the odd power function, the continuous combined curve $\Gamma_{L4}$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}: x_{40} = t, y_{40} = At^{2n1-1} \ (t_1 \le t < 0) \\ \Gamma_{L42}: x_{40} = t, y_{40} = Bt^{2n2-1} \ (0 \le t \le t_2) \end{cases},$$

where $x_{40}$ and $y_{40}$ are x-axis and y-axis coordinate values of the combined curve in the rectangular coordinate system, respectively; a parameter t is an independent variable of the equation; $t_1$ and $t_2$ are value ranges of the continuous curve; A and B are coefficients of the equation; and n1 and n2 are degrees of the independent variable and are positive integers.

When the continuous combined curve $\Gamma_L$ is the combined curve $\Gamma_{L5}$ of the sine function, the continuous combined curve $\Gamma_{L5}$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}: x_{50} = t, y_{50} = A_1\sin(B_1t) \ (t_1 \le t < 0) \\ \Gamma_{L52}: x_{50} = t, y_{50} = A_2\sin(B_2t) \ (0 \le t \le t_2) \end{cases},$$

where $x_{50}$ and $y_{50}$ are x-axis and y-axis coordinate values of the combined curve in the rectangular coordinate system, respectively; a parameter t is an independent variable of the equation; $t_1$ and $t_2$ are value ranges of the continuous curve; and $A_1$, $B_1$, $A_2$ and $B_2$ are coefficients of the equation.

When the continuous combined curve $\Gamma_L$ is the combined curve $\Gamma_{L6}$ of the epicycloid function, the continuous combined curve $\Gamma_{L6}$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ \quad x_{60} = -(R_1+r_1)\sin t + e\sin((R_1+r_1)t/r_1) \quad (t_1 \le t < 0) \\ \quad y_{60} = -(R_1+r_1)\cos t + e\cos((R_1+r_1)t/r_1) + (R_1+r_1-e) \\ \Gamma_{L62}: \\ \quad x_{60} = (R_2+r_2)\sin t - e\sin((R_2+r_2)t/r_2) \quad (0 \le t < t_2) \\ \quad y_{60} = (R_2+r_2)\cos t - e\cos((R_2+r_2)t/r_2) - (R_2+r_2-e) \end{cases},$$

where $x_{60}$ and $y_{60}$ are x-axis and y-axis coordinate values of the combined curve in the rectangular coordinate system, respectively; a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; and e is an eccentric distance.

In the present disclosure, the inflection point or the tangent point of the continuous combined curve $\Gamma_L$ is as follows:

1. When the continuous combined curve is a combined curve of an odd power function, a combined curve of a sine function or a combined curve of an epicycloid function, a connection point of the continuous combined curve is an inflection point, that is, a concave-convex boundary point of the curve, a second derivative of the curve is zero at this point, and second order derivative signs near two sides of this point are opposite;

2. when the combined curve is a combined curve of an odd power function curve and a tangent at an inflection point thereof, a combined curve of a sine function curve and a tangent at an inflection point thereof, or a combined curve of an epicycloid and a tangent at an inflection point thereof, a connection point of the combined curve is an inflection point of the odd power function curve, the sine function curve or the epicycloid (meaning the same as 1), which is also a tangent point of the odd power function curve, the sine function curve or the epicycloid at the tangent.

Figure 5:
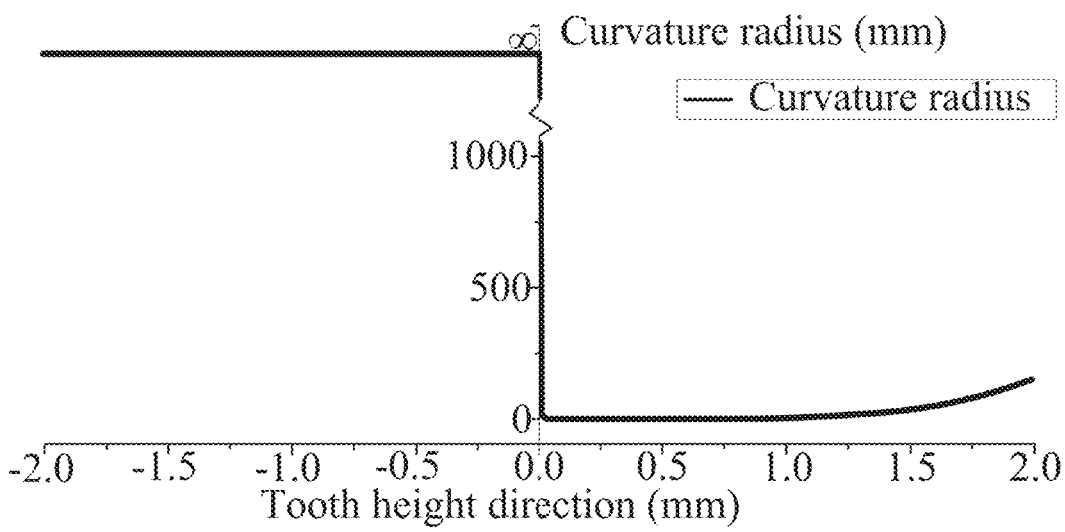
FIG. 5 is a schematic diagram illustrating a curvature radius at a meshing point of a bevel gear pair with a constructed tooth pair having a combined curve of an odd power function curve and a tangent at an inflection point thereof as a tooth profile curve according to an embodiment of the present disclosure.

At the inflection point or the tangent point of the continuous combined curve, the curvature of the curve is zero, that is, the curvature radius tends to infinity. When the continuous combined curve is the combined curve of the odd power function, the combined curve of the sine function, or the combined curve of the epicycloid function, the curvature radii on two sides of the inflection point tend to infinity; or when the continuous combined curve is the combined curve of the odd power function curve and the tangent at the inflection point thereof, the combined curve of the sine function curve and the tangent at the inflection point thereof, or the combined curve of the epicycloid function curve and the tangent at the inflection point thereof, the curvature radius at the inflection point on the side of the odd power function curve, the sine function curve or the epicycloid function curve tends to infinity, and the curvature radius on the side of the tangent is infinite. The curvature radius of the combined curve is calculated based on given parameters in the embodiment, as shown in FIG. 5. The curvature radius of a straight line segment in the combined curve is infinite, and thus is not described in the figure. The curvature radius at the inflection point in FIG. 5 tends to infinity, and the curvature radius of the cubic power function curve segment gradually decreases and then increases, but is still far less than the curvature radius at the inflection point. This means that the curvature radius at a contact point of the bevel gear pair with a constructed tooth pair tends to infinity, which improves the bearing capacity of the bevel gear pair with a constructed tooth pair.

Figure 6:
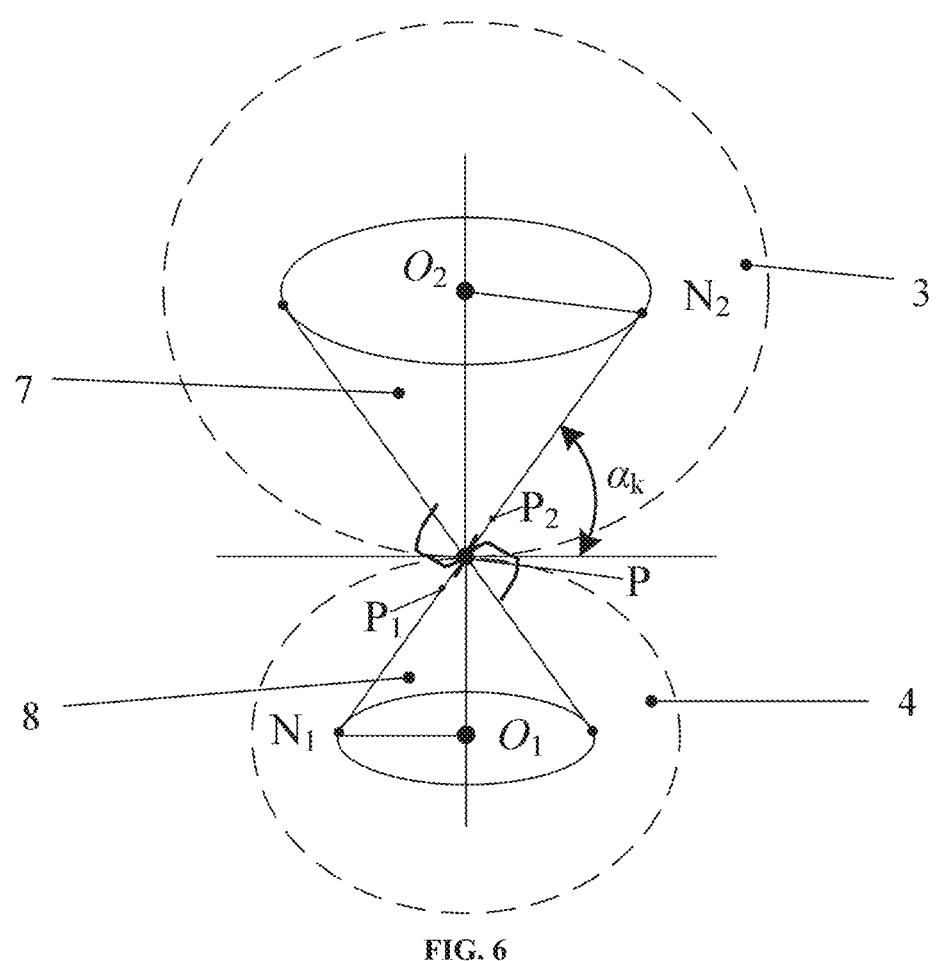
FIG. 6 is a schematic diagram illustrating a designated point on a meshing force action line of a bevel gear pair with a constructed tooth pair having a combined curve of an odd power function curve and a tangent at an inflection point thereof as a tooth profile curve according to an embodiment of the present disclosure.

In the present disclosure, the inflection point or the tangent point of the continuous combined curve is a designated point located on a meshing force action line of the bevel gear pair. The designated point is specifically defined as a given point at a pitch point or near the pitch point on the meshing force action line of the bevel gear pair with a constructed tooth pair that is a straight line which forms a certain angle (pressure angle) with a horizontal axis by means of the pitch point. FIG. 6 is a schematic diagram of a designated point on a meshing force action line of a bevel gear pair. In the figure, P is the designated point on the meshing force action line of the bevel gear pair; $P_1$ and $P_2$ are limit points of the position range of the designated point; a straight line $N_1N_2$ is the meshing force action line of the bevel gear pair; $\alpha_k$ is a pressure angle; and $O_1$ and $O_2$ are central points of the bevel gear I 1 with a constructed tooth pair and the bevel gear II 2 with a constructed tooth pair, respectively. The designated point P is a given point usually located at a pitch point or near either of two sides of the pitch point, and a variation area of the designated point does not exceed a half of a tooth height.

Figure 7:
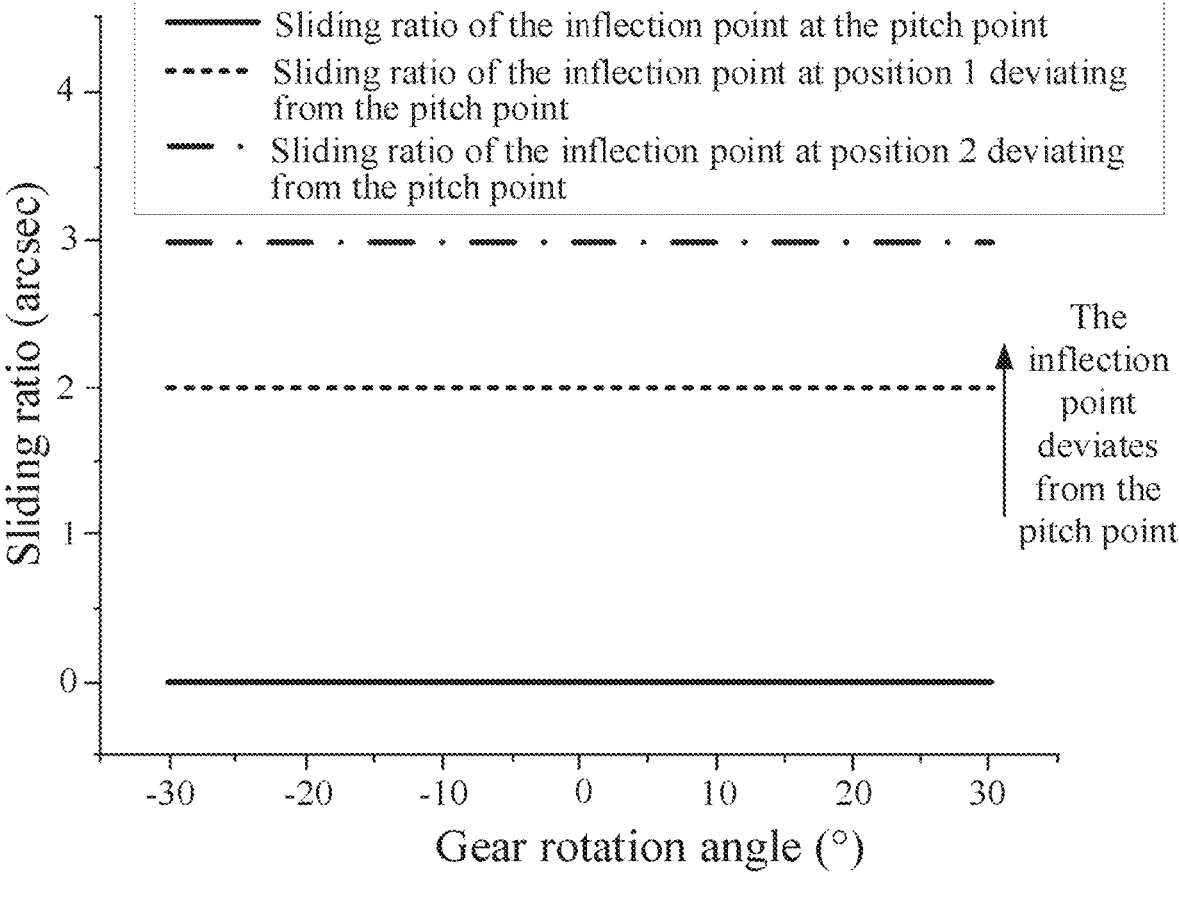
FIG. 7 is a schematic diagram illustrating a sliding ratio at a meshing point of a bevel gear pair with a constructed tooth pair having a combined curve of an odd power function curve and a tangent at an inflection point thereof as a tooth profile curve according to an embodiment of the present disclosure.

According to the principle of gear meshing, it can be known that there is no relative sliding between tooth surfaces when the bevel gear pair with a constructed tooth pair meshes at the pitch point. FIG. 7 is a schematic diagram illustrating a sliding ratio at a meshing point of a bevel gear pair with a constructed tooth pair having a combined curve of an odd power function curve and a tangent at an inflection point thereof as a tooth profile curve according to an embodiment of the present disclosure. Since the bevel gear pair with constant meshing characteristics with a constructed tooth pair meshes at the pitch point at any time in the embodiment, the bevel gear pair with a constructed tooth pair can achieve zero-sliding meshing. When the inflection point or the tangent point of the combined curve does not coincide with the pitch point, the sliding ratio of the bevel gear pair with a constructed tooth pair is also constant but is not zero. A closer inflection point or tangent point of the continuous curve to the pitch point indicates a smaller sliding ratio of the bevel gear pair with a constructed tooth pair, vice versa. When the inflection point or the tangent point coincides with the pitch point, the bevel gear pair with a constructed tooth pair can achieve zero-sliding meshing transmission, which reduces the wear between tooth surfaces and improves the transmission efficiency of the bevel gear pair with a constructed tooth pair.

It should be noted that it is obvious to those skilled in the art that the present disclosure is not limited to the details of the above exemplary embodiments, and that the present disclosure can be implemented in other specific forms without departing from the spirit or basic features of the present disclosure. Therefore, the embodiments should be regarded as exemplary and non-limiting in every respect. The scope of the present disclosure is defined by the appended claims rather than the above description. Therefore, all changes falling within the meaning and scope of equivalent elements of the claims should be included in the present disclosure, and any reference sign in the claims should not be construed as a limitation to the claims involved.

Specific examples are used for illustration of the principles and implementations of the present disclosure. The description of the above embodiments is merely used to help understand the method and its core ideas of the present disclosure. In addition, those of ordinary skill in the art can make modifications in terms of specific implementations and scope of use according to the ideas of the present disclosure. In conclusion, the content of this description shall not be construed as limitations to the present disclosure.

What is claimed is:

1. A bevel gear pair with constant meshing characteristics with a constructed tooth pair, comprising a bevel gear I with a constructed tooth pair and a bevel gear II with a constructed tooth pair as a pair based on conjugate curves, wherein a normal tooth profile curve $\Gamma_{s1}$ of the bevel gear I with a constructed tooth pair and a normal tooth profile curve $\Gamma_{s2}$ of the bevel gear II with a constructed tooth pair are continuous combined curves $\Gamma_L$ with the same curve shape, and the continuous combined curves $\Gamma_L$ comprise a combined curve $\Gamma_{L1}$ of an odd power function curve and a tangent at an inflection point thereof; the continuous combined curve $\Gamma_L$ is formed by two continuous curves, a connection point of the two continuous curves is an inflection point or a tangent point of the continuous combined curve, and the inflection point or the tangent point of the continuous combined curve $\Gamma_L$ is a designated point located on a meshing force action line of the bevel gear pair with a constructed tooth pair; and the normal tooth profile curve $\Gamma_{s1}$ and the normal tooth profile curve $\Gamma_{s2}$ are swept along given conjugate curves to obtain tooth surfaces of the bevel gear I with a constructed tooth pair and the bevel gear II with a constructed tooth pair;

wherein when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve $\Gamma_L$, and an equation of the combined curve $\Gamma_{L1}$ of the odd power function curve and the tangent at the inflection point thereof is as follows:

$$\begin{cases} \Gamma_{L11}: x_{10} = t, y_{10} = 0 \ (t_1 \le t < 0) \\ \Gamma_{L12}: x_{10} = t, y_{10} = At^{2n-1} \ (0 \le t \le t_2) \end{cases},$$

wherein $x_{10}$ and $y_{10}$ are x-axis and y-axis coordinate values of the combined curve in the rectangular coordinate system, respectively; a parameter t is an independent variable of the equation; $t_1$ and $t_2$ are value ranges of the continuous curve; A is a coefficient of the equation; and n is a degree of the independent variable and is a positive integer.

2. The bevel gear pair with constant meshing characteristics with a constructed tooth pair according to claim 1, wherein a curve equation of the normal tooth profile curve $\Gamma_{s1}$ of the bevel gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4, 5, 6),$$

wherein $x_{01}$ and $y_{01}$ are x-axis and y-axis coordinate values of the normal tooth profile curve $\Gamma_{s1}$ of the bevel gear I with a constructed tooth pair in the rectangular coordinate system, respectively.

3. The bevel gear pair with constant meshing characteristics with a constructed tooth pair according to claim 2, wherein a curve equation of the normal tooth profile curve $\Gamma_{s2}$ of the bevel gear II with a constructed tooth pair obtained by rotating the normal tooth profile curve $\Gamma_{s1}$ of the bevel gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

wherein $x_{02}$ and $y_{02}$ are x-axis and y-axis coordinate values of the normal tooth profile curve $\Gamma_{s2}$ of the bevel gear II with a constructed tooth pair in the rectangular coordinate system, respectively.

4. The bevel gear pair with constant meshing characteristics with a constructed tooth pair according to claim 2, wherein a tooth surface $\Sigma_1$ of the bevel gear I with a constructed tooth pair is obtained by sweeping the normal tooth profile curve $\Gamma_{s1}$ of the bevel gear I with a constructed tooth pair along a given helix, with a tooth surface equation as follows:

$$\begin{pmatrix} x_{\Sigma 1} \\ y_{\Sigma 1} \\ z_{\Sigma 1} \\ 1 \end{pmatrix} = M_{1\sigma_1} \cdot \begin{pmatrix} x_{01} \\ y_{01} \\ 0 \\ 1 \end{pmatrix},$$

wherein $x_{\Sigma 1}$, $y_{\Sigma 1}$ and $z_{\Sigma 1}$ are coordinate values of the tooth surface of the bevel gear I with a constructed tooth pair; and $M_{1\sigma_1}$ is a sweep transformation matrix.

5. The bevel gear pair with constant meshing characteristics with a constructed tooth pair according to claim 3, wherein a tooth surface $\Sigma_2$ of the bevel gear II with a constructed tooth pair is obtained by sweeping the normal tooth profile curve $\Gamma_{s2}$ of the bevel gear II with a constructed tooth pair along a given helix, with a tooth surface equation as follows:

$$\begin{pmatrix} x_{\Sigma 2} \\ y_{\Sigma 2} \\ z_{\Sigma 2} \\ 1 \end{pmatrix} = M_{2\sigma_1} \cdot \begin{pmatrix} x_{02} \\ y_{02} \\ 0 \\ 1 \end{pmatrix},$$

wherein $x_{\Sigma 2}$, $y_{\Sigma 2}$ and $z_{\Sigma 2}$ are coordinate values of the tooth surface of the bevel gear II with a constructed tooth pair, respectively; and $M_{2\sigma_2}$ is a sweep transformation matrix.

* * * * *